United States Patent [19]
Engelke et al.

[11] 3,809,314
[45] May 7, 1974

[54] SELF-POWERED VARIABLE VOLUME AIR DAMPER CONTROL

[76] Inventors: Roger P. Engelke, 629 Rome Ave., Rockford, Ill. 61107; Marvin H. Zille, c/o Barber-Colman Company, Rockford, Ill. 61101

[22] Filed: Mar. 21, 1973

[21] Appl. No.: 343,219

Related U.S. Application Data

[63] Continuation of Ser. No. 190,914, Oct. 20, 1971, abandoned.

[52] U.S. Cl.............................. 236/49, 236/82
[51] Int. Cl.............................. F24f 13/10
[58] Field of Search............. 236/49, 80, 82; 98/1.5

[56] References Cited
UNITED STATES PATENTS 3,719,321  3/1973  McNabney................. 236/49
3,045,983  7/1962  Best.......................... 137/85
2,352,584  6/1944  Ziebolz et al.............. 137/90
3,537,644  11/1970 Davidson................... 236/80
3,122,318  2/1964  Null.......................... 236/80
3,687,364  8/1972  McNabney................. 236/49
3,465,962  9/1969  Matulich et al........... 236/80

Primary Examiner—William E. Wayner
Assistant Examiner—William E. Tapolcai, Jr.
Attorney, Agent, or Firm—A. Richard Koch

[57] ABSTRACT

A self-powered control operates a damper to regulate volume flow of air from a duct into a conditioned space solely as a function of a sensed condition regardless of air supply pressure.

8 Claims, 1 Drawing Figure

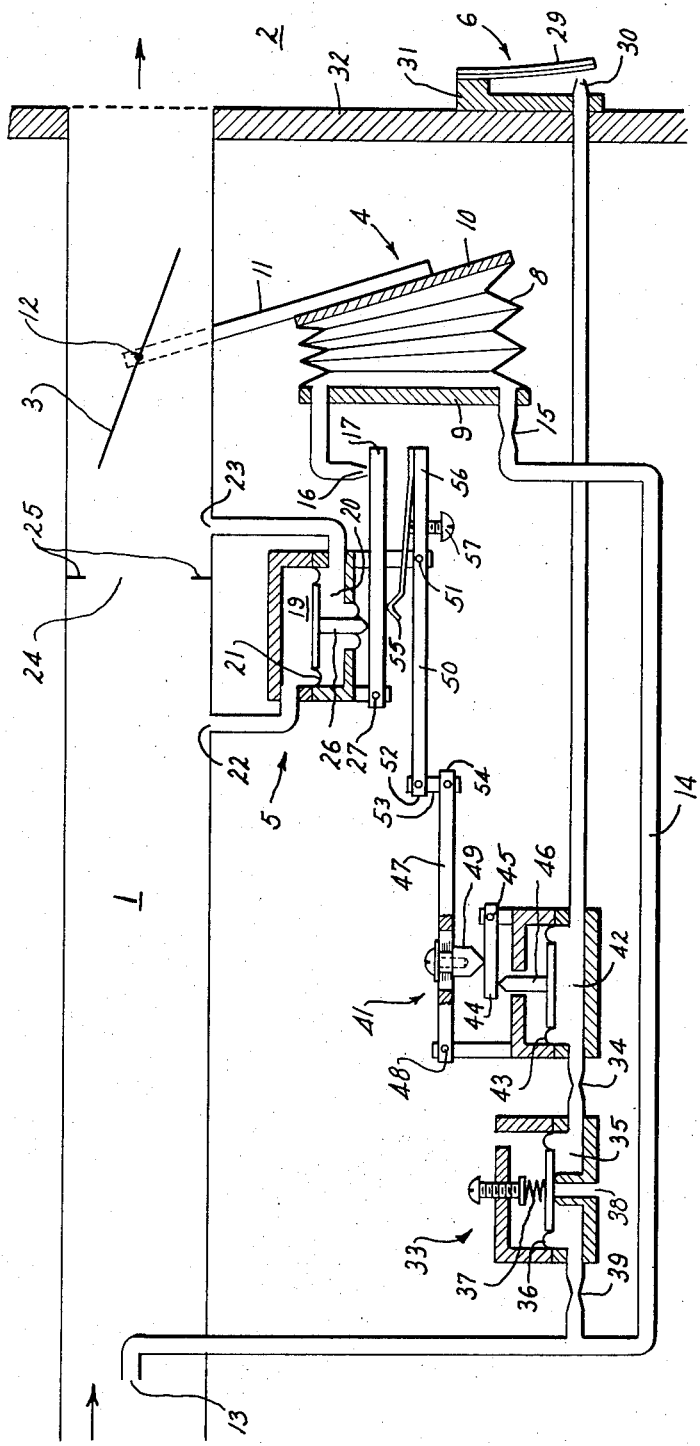
INVENTORS
ROGER P. ENGELKE
MARVIN H. ZILLE
BY  A. Richard Koch
AGENT

SELF-POWERED VARIABLE VOLUME AIR DAMPER CONTROL

CROSS REFERENCE TO RELATED APPLICATION

This application is a continuation of our copending application Ser. No. 190,914, filed on Oct. 20, 1971, now abandoned.

BACKGROUND OF THE INVENTION

This invention is concerned with apparatus which controls volume flow of conditioned air into a controlled space in response to variations of a sensed condition, such as temperature or humidity, in the controlled space and compensates for variations in the sensed air flow through the duct.

In controlling a condition in a space, the flow of conditioned air from an outlet into the space has been automatically controlled by dampers in the supply ducts. A sensor, such as a thermostat, senses the condition in the space and provides a signal to an actuator positioning the damper. If a number of controlled outlets are supplied with conditioned air from a single source, there may be a decided variation in pressure of air delivered by the ducts to different outlets. This would affect the speed of response of the system. In order to overcome this variation in speed of response, a second damper has been provided upstream from the condition controlled damper to regulate the pressure of the air in the duct immediately upstream from the condition controlled damper. Such a regulator is described in Albert W. Schach's U.S. Pat. No. 3,361,157, issued on Jan. 2, 1968 and reissued on Oct. 14, 1969 as Re. 26,690.

The provision of two dampers and their respective actuators results in a control occupying considerable space, which is often at a premium. The additional damper and actuator require more material, increase the cost and decrease reliability of the control.

SUMMARY OF THE INVENTION

This invention combines the functions of the dampers and their actuators in a single damper and actuator without sacrificing any of the desirable features of a combination sensed condition and flow responsive control. The control may be self-powered so that no outside power need be supplied and no extra operating cost is incurred. It is an inexpensive, compact unit easily and quickly installed.

BRIEF DESCRIPTION OF THE DRAWING

The drawing is a schematic diagram of a preferred embodiment of this invention.

DESCRIPTION OF THE PREFERRED EMBODIMENT

As shown in the drawing, a preferred embodiment of this invention comprises a duct 1 delivering conditioned air from a supply (not shown) at the left to a controlled space 2 at the right. A damper 3 regulates flow of the conditioned air through the duct 1 into space 2 and the position of the damper is adjusted by an actuator 4. The actuator is responsive both to a condition to which a sensor 6, located in the controlled space 2, responds, and to a signal produced in response to variations in the flow of air through duct 1, as indicated by a flow detector 5.

The actuator 4 comprises a bellows 8, having a fixed end closure 9 and a movable end closure 10. The movable end 10 is connected by a linkage, shown as an arm 11 affixed to a shaft 12 on which the butterfly damper 3 is rigidly fastened, to position the damper 3. Air for operating the actuator 4 is obtained by extracting a portion of the air in said duct 1 by means of a dynamic pressure air inlet 13, upstream from the damper 3, and passing such air through tube 14 and a restriction 15 into the bellows 8. The pneumatic operating pressure in the bellows is controlled by a bleed nozzle 16 and a cooperating flapper 17.

The flow detector 5 comprises a pair of sealed chambers 19, 20 separated by a common movable wall, such as a flexible diaphragm 21. A high static pressure air inlet 22, located upstream from the damper 3, supplies pneumatic pressure to the high pressure chamber 19 and a low static pressure air inlet 23, located between the damper 3 and the high pressure inlet 22, supplies air under lesser pneumatic pressure to the lower pressure chamber 20. An orifice 24, formed by an orifice plate 25 located between the static pressure inlets 22,23 such that inlet 23 is in the low pressure area behind the orifice plate 25, provides the difference in pneumatic pressure, indicative of the rate of air flow through the duct. This pressure difference acting on the diaphragm 21 produces a flow responsive variable mechanical force signal that is transmitted to flapper 17 by means of a pin 26. A pivot 27, about which the flapper turns, is located to amplify the signal controlling the bleed from nozzle 16.

The sensor 6 is shown as comprising a laminated strip 29, such as a bimetal, deflectable with variations in the sensed condition, such as temperature or humidity, to control bleed of air from a nozzle 30, both strip and nozzle being mounted on a base 31. The sensor 6 is located in the controlled space 2 in a position where it is subjected to a condition representative of the condition in the space. It may be mounted on a wall 32, defining one of the limits of the controlled space. Air is supplied to the nozzle 30 through the dynamic pressure inlet 13, a pressure regulator 33 and a restrictor 34. The regulator 33 comprises a pressure chamber 35, having a flexible diaphragm 36 biased by a spring 37 in opposition to the pneumatic pressure in the chamber to close a vent 38. A restrictor 39 between the dynamic pressure inlet 13 and chamber 35 limits flow of unregulated air into the chamber. When the air pressure in chamber 35 exerts a greater force than the spring 37 on diaphragm 36, the diaphragm moves away from the vent 38, permitting air to escape from chamber 35 to atmosphere until the forces on the diaphragm are equalized. Air at regulated pneumatic pressure is thus delivered from chamber 35 to restrictor 34.

An operator 41 in the form of a pneumatic-mechanical transducer has a pressure chamber 42 with a side, such as diaphragm 43, movable by pneumatic operating pressure in the chamber. The operating pressure in chamber 42 is supplied by air received through restrictor 34 and controlled by the sensor 6. As shown, the chamber 42 is in series between restrictor 34 and nozzle 30. An arm 44, pivoted on pintle 45, is moved in response to flexure of the diaphragm 43, as by pin 46. A lever 47 overlies the arm 44 and is pivoted on a fixed pintle 48 beyond the free end of the arm, so that an abutment 49, mounted for movement along the lever, engages the arm and may be adjusted to amplify the motion of the arm. A lever 50, pivoted on a fixed pintle 51 intermediate its ends, has an end 52 joined by a pivoted link 53 to free end 54 of lever 47, so as to be movable thereby. A leak spring 55, or other resilient means is fastened to the other end 56 of lever 50 to convert the motion of the lever into a condition variable mechanical force signal. The spring abuts the flapper 17 so that the flow variable signal from flow detector 5 is combined with the condition variable signal to provide a composite signal transmitted by the flapper to nozzle 16. The condition variable signal is adjustable by a screw 57, threaded through lever 50 and abutting leaf spring 55.

Air flow in duct 1 is a function of both the position of the damper 3 and of the difference between the air pressures in the duct upstream from the damper and in the conditioned space 2. Air flow may be measured at any location in the branch duct 1. At a given sensed condition in space 2, as the duct air pressure increases, the flow of conditioned air through the branch duct 1 also increases, so that more air is delivered into the space. According to this invention, the position of the damper 3 is moved toward closed position in response to an increase in flow to compensate for the increased pressure and maintain constant the volume flow of conditioned air into the space 2. In like manner, upon a decrease in duct air pressure, the damper 3 is moved toward open position to compensate for the decrease and maintain a constant volume flow. The volume flow of conditioned air into space 2 is therefore solely a function of the sensed condition in the space. The volume flow of conditioned air remains constant as long as the sensed condition is constant, but changes as the sensed condition changes.

It will be apparent to those skilled in the art that many embodiments of this invention are possible. For example, a bladder damper could be substituted for the damper 3 and actuator 4. The condition and flow responsive signals could be electrical, said electrical signals being combined and utilized to energize an electro-pneumatic relay, controlling exhaust from the actuator 4. A Venturi tube could be substituted for the orifice plate 25. A Pitot tube could be used to measure flow. While only one embodiment has been shown and described, the scope of this invention is determined by the claims rather than by the description.

We claim:

1. A volume control regulating volume flow of conditioned air into a controlled space in response to a condition sensor in said space, said control comprising a duct to deliver the conditioned air into said space, a damper regulating flow of the air through said duct, an actuator positioning said damper, an operator supplying a condition variable signal in response to said condition sensor, a flow detector supplying a continuous flow variable signal in response to flow of the conditioned air through the duct, means for combining said condition variable and flow variable signals to provide a single composite signal controlling said actuator, means for supplying air for operating the actuator, a restriction in said air supplying means, and means for controlling exhaust of the air from said actuator in response to said composite signal.

2. A volume control according to claim 1 wherein the air for operating the actuator is provided by a portion of said conditioned air.

3. A volume control according to claim 1 in which said operator, said detector and said exhaust control means are operated by pneumatic pressures.

4. A volume control according to claim 3 wherein the pneumatic pressures are provided by portions of said conditioned air.

5. A variable volume control according to claim 4 wherein said operator is a transducer converting said pneumatic pressure into a mechanical motion output in response to said condition sensor.

6. A volume control according to claim 5, said operator additionally comprising means for amplifying said motion.

7. A volume control according to claim 5, said operator additionally comprising resilient means for converting said motion into a mechanical force providing said condition variable signal.

8. A volume control according to claim 3 wherein said flow detector produces a flow variable mechanical force providing the flow variable signal.

* * * * *

UNITED STATES PATENT OFFICE
CERTIFICATE OF CORRECTION

Patent No. 3,809,314           Dated May 7, 1974

Inventor(s) Roger P. Engelke and Marvin H. Zille

It is certified that error appears in the above-identified patent and that said Letters Patent are hereby corrected as shown below:

On page 1 add    -- [73] Assignee Barber-Colman Company, Rockford, Illinois --.

In claim 5, line 1, delete "variable" and change "4" to --3--.

Signed and sealed this 10th day of September 1974.

(SEAL)
Attest:

McCOY M. GIBSON, JR.
Attesting Officer

C. MARSHALL DANN
Commissioner of Patents